United States Patent [19]

Horacek et al.

[11] 4,389,454
[45] Jun. 21, 1983

[54] MOLDED FOAMED POLYURETHANE PART HAVING A LIGHTWEIGHT SKIN AND A PROCESS FOR ITS MANUFACTURE

[75] Inventors: Heinrich Horacek, Ludwigshafen; Matthias Marx, Bad Durkheim; Dietmar Hobein, Neu-Estingen, all of Fed. Rep. of Germany

[73] Assignee: BASF Aktiengesellschaft, Ludwigshafen, Fed. Rep. of Germany

[21] Appl. No.: 252,060

[22] Filed: Apr. 8, 1981

[30] Foreign Application Priority Data

Apr. 12, 1980 [DE] Fed. Rep. of Germany ....... 3014161

[51] Int. Cl.³ .............................................. B29D 27/04
[52] U.S. Cl. ................................ 428/318.6; 264/46.6; 264/53; 264/54; 264/255; 264/267; 528/44; 528/85
[58] Field of Search .................. 264/46.6, 54, 53, 255, 264/267; 428/318.6; 528/44, 85

[56] References Cited

U.S. PATENT DOCUMENTS

| 2,778,810 | 1/1957 | Müller et al. | 525/440 |
| 3,099,516 | 7/1963 | Henrickson | 264/48 |
| 3,105,062 | 9/1963 | Graham et al. | 528/44 |
| 3,428,610 | 2/1969 | Klebert | 528/64 |
| 3,487,134 | 12/1969 | Burr | 264/54 X |
| 3,576,930 | 4/1971 | Watters et al. | 264/46.6 |
| 3,795,722 | 3/1974 | Sassaman | 264/46.6 X |
| 4,025,466 | 5/1977 | Jourquin et al. | 521/115 |
| 4,242,410 | 12/1980 | Konig et al. | 264/46.6 X |
| 4,282,285 | 8/1981 | Mohiuddin | 264/46.6 X |
| 4,294,880 | 10/1981 | Nishida | 264/46.6 X |

FOREIGN PATENT DOCUMENTS 2004048 1/1970 Fed. Rep. of Germany.
2261065 12/1972 Fed. Rep. of Germany.

*Primary Examiner*—Philip E. Anderson
*Attorney, Agent, or Firm*—David L. Hedden; Joseph D. Michaels

[57] ABSTRACT

The invention relates to the preparation of molded polyurethane parts having a lightfast polyurethane skin. The skin is formed by applying a reaction mixture comprising an organic polyisocyanate, a polyol, a chain extender, an aliphatic primary or secondary aliphatic diamine, and a catalyst, by a one-shot process in the absence of solvents, to the inside wall of the molding tool.

The molded parts produced in accordance with this invention are used, for instance, in the automobile industry for the inside equipment of vehicles. Specifically, they may be used as cover plates for steering wheels and for lining doors. They may also be used for external equipment such as bumpers, headlight housings, and may be used in the electrical industry as housing elements.

12 Claims, 3 Drawing Figures

MOLDED FOAMED POLYURETHANE PART HAVING A LIGHTWEIGHT SKIN AND A PROCESS FOR ITS MANUFACTURE

BACKGROUND OF THE INVENTION

1. Field of the Invention

The invention relates to the preparation of molded polyurethane parts having a lightfast polyurethane skin. The skin is formed by applying a reaction mixture comprising an organic polyisocyanate, a polyol, a chain extender, an aliphatic diamine, and a catalyst, by a one-shot process in the absence of a solvent, to the inside wall of a molding tool.

2. Description of the Prior Art

The preparation of cross-linked plastics by the isocyanate-polyaddition process is known in the art. According to German Application No. 1,196,864 (U.S. Pat. No. 3,099,516), hydroxyl group containing compounds and polyisocyantes are foamed in molds in the presence of blowing agents and catalysts to prepare cross-linked plastics. Flexible and rigid polyurethane elastomers, as well as modifications between these two extremes, can be produced according to this process with suitable selection of the hydroxyl group containing compounds and organic polyisocyanates as well as by the additional use of chain extenders such as glycols or diamines.

In order to prepare polyurethane elastomers, isocyanate group containing prepolymers are initially produced from the hydroxyl group containing compounds and polyisocyanates which are then reacted in a second stage with chain extenders to result in high molecular weight elastomers. See for example German Pat. No. 831,604 (U.S. Pat. No. 2,778,810).

If diamines are used as chain extenders, variations in processing must be made. According to German Application No. 1,149,523 (U.S. Pat. No. 3,105,062) crystalline aromatic diprimary diamines are incorporated in the liquid isocyanate group-containing prepolymers, in a quantity which is insufficient for saturating the isocyanate groups, at a temperature below the melting point of the diamines. The masses are subsequently cured by heating. In accordance with German Pat. No. 1,240,654 (U.S. Pat. No. 3,428,610), isocyanate group-containing prepolymers are reacted at room temperature or modestly increased temperatures with liquid or dissolved aromatic diamines which have at least one linear alkyl substituent in the ortho position to the first amino group and two linear alkyl substituents with one to three carbon atoms in the ortho position to the second amino group.

In order to produce molded polyurethane parts with a flexible surface skin, solutions of isocyanate group containing prepolymers and diamine solutions are mixed and are sprayed onto the substrate, for instance, the inside wall of a molding tool. After evaporation of the solvent, a polyurethane-polyurea coating is obtained. See for example German Published Application No. 1,816,554 (U.S. Pat. No. 3,576,930). Lightfast molded polyurethane parts can also be produced according to the following processes:

(1) Integral foam formulations based on aliphatic polyisocyanates may be foamed, for instance, according to processes analogous to German Published Application No. 2,710,901 (U.S. Pat. No. 4,025,466). The problem with this method is that expensive aliphatic polyisocyanates are consumed in large quantities and that a uniformly unfoamed surface which is free of color schlieren is rarely achieved.

(2) Completed molded foam parts may be coated with polyurethane coatings. This mode of operation generally results in adhesion problems between the surface layer and the foam core since the completed foam core always contains residues of the mold release agent at the surface. An added problem with thicker layers is that an undistorted shaping of the surface of the foam core cannot be guaranteed. This is a problem particularly in those cases where the surface structure of the foam core, for instance, a leatherlike graining, should remain visible.

(3) "In-mold coating", that is by coating the inside wall of the molding tool with lightfast solvent containing polyurethane systems. The problems with this mode of operation are the expensive drying stages which may cause long cycle times and the considerable stress on the environment. If solvent-free polyurethane formulations are used, lightfast surfaces could not be sprayed according to the two-component process because of low reactivity of aliphatic polyisocyanates used in such systems. The solvent-free formulations remain very thin for a long period of time and run down the vertical walls of the mold and collect in the horizontal parts of the molds. It, therefore, proved impossible to produce uniform coatings with constant layer thickness.

SUMMARY OF THE INVENTION

A process has been discovered for the preparation of molded parts having a lightfast polyurethane skin and a polyurethane foam core comprising
1. applying a mixture of the following ingredients, which are reacted in one stage, to the inside wall of an open mold in an amount sufficient to form a skin for the molded part:
    (a) an organic polyisocyanate,
    (b) a polyol having a molecular weight of 1000 to 8000,
    (c) an aliphatic primary or secondary diamine,
    (d) a chain extender, other than c, having a molecular weight of 60 to 600, and
    (e) a catalyst; and
2. filling the mold with a foamable polyurethane reaction mixture.

By using a highly reactive aliphatic primary or secondary diamine in addition to the polyol and chain extender in combination with an aliphatic or cycloaliphatic polyisocyanate (which may be modified) in the absence of solvents, polyurethane systems are obtained which have cream times of as little as a fraction of a second. The transition from the liquid into the solid phase takes place almost instantaneously. This results in the liquid reaction mixture solidifying into a lightfast skin almost immediately after spraying to the inside wall of the molding tool. The reaction mixture does not run off the side walls of the molding tool which is normally observed with diamine-free polyurethane systems or solvent-containing prepolymeric diamines systems. The process according to this invention facilitates the manufacture of skins which are 0.5 millimeter to 5 millimeters thick, or even thicker depending upon the temperature of the molding tool, and with curing times of from less than 5 seconds to approximately 3 minutes. The foamable polyurethane resulting in the foam core can be introduced into the molding tool immediately after the skin has solidified so that the molded parts can be produced with very short cycle times.

The molded parts produced in accordance with this invention are used, for instance, in the automobile industry for the inside equipment of vehicles. Specifically, they may be used as cover plates for steering wheels and for lining doors. They may also be used for external equipment such as bumpers, headlight housings, and may be used in the electrical industry as housing elements.

DESCRIPTION OF THE PREFERRED EMBODIMENT

Figure 1:
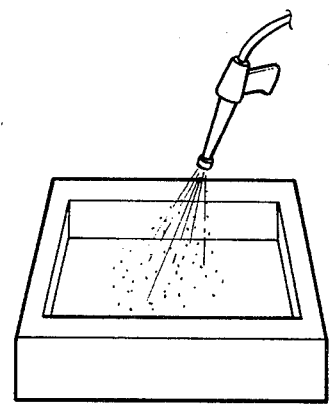
FIG. 1 is a top view which shows the spraying of the coating composition in the mold.
Figure 2:
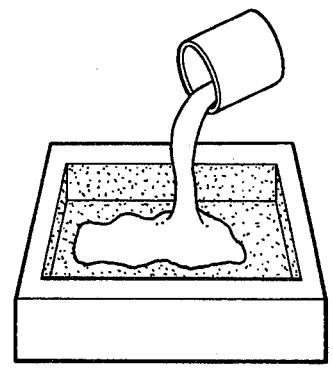
FIG. 2 is a top view which shows the filling of the mold with a foamable polyurethane mixture.
Figure 3:
FIG. 3 is a cross-sectional view of the mold with lid and polyurethane foam with a light-resistant skin. The dark directional lines between the bottom of the mold lid and the inside perimeter of the mold represent the foam and light-stable coating.

The ingredients used to prepare the polyurethane skin and the polyurethane foam core will first be described. Then the details, relative to the process for forming the polyurethane parts, will be described.

Organic polyisocyanates (a) to be used in accordance with this invention to prepare the polyurethane skin have the formula $R(NCO)_n$, wherein R is a multifunctional aliphatic, cycloaliphatic, or mixed radical, which may contain urethane, biuret and/or isocyanurate groups; and n represents a whole number, the value of which corresponds with the valency number of R and is at least 2, preferably 2 to 3. Representative examples of organic polyisocyanates include: aliphatic diisocyanates such as ethylene diisocyanate, propylene diisocyanate, butane-1,4-diisocyanate, 2,2,4-trimethylhexamethylene-1,6-diisocyanate and preferably hexamethylene-1,6-diisocyanate; cycloaliphatic diisocyanates such as cyclohexane-1,2-diisocyanate, cyclohexane-1,4-diisocyanate, 1-methylcyclohexane-2,4- and 2,6-diisocyanate as well as the corresponding isomer mixtures, 4,4'-, 2,4'- and 2,2'-dicyclohexymethane diisocyanate as well as the corresponding isomer mixtures, and preferably 3-isocyanatomethyl-3,5,5-trimethylcyclohexylisocyanate (isophorone diisocyanate) and polyisocyanates such as polycyclohexyl polymethylene polyisocyanates with 2 to 6, preferably 3, cyclohexylene radicals in the molecule.

Modified polyisocyanates having isocyanurate, biuret, and particularly urethane groups may also be used as well as their mixtures with aliphatic or cycloaliphatic diisocyanates. The manufacture of isocyanurate group containing polyisocyanates which preferably have isocyanate contents of 15 to 30 percent by weight, is described among other places in German Pat. Nos. 1,022,789, 1,222,067 and 1,027,394 as well as German Published Application No. 1,929,034 and 2,004,048. Biuret group containing polyisocyanates have isocyanate contents of 15 to 30, preferably 20 to 25 percent by weight and viscosities of 500 to 6000, preferably of 1000 to 4000 mPas at 20° C. and are described, for instance, in German Pat. No. 1,101,394 and German Published Application No. 2,261,065. Urethane group containing polyisocyanates may be prepared for instance by reacting the previously mentioned aliphatic or cycloaliphatic diisocyanates such as hexamethylene diisocyanate and isophorone diisocyanate, with unsubstituted and substituted or modified alkane diols having 2 to 10, preferably 2 to 6 carbon atoms in the alkylene radical such as ethylene glycol, 1,4-butanediol, dipropylene glycol, 1,6-hexanediol and neopentylglycol as well as hydroxypivalic acid neopentylglycol or their mixtures in mole ratios of approximately 2:1.

Preferably used as organic polyisocyanates are aliphatic and cycloaliphatic diisocyanates particularly hexamethylene and isophorone diisocyanate as well as urethane group containing diisocyanates and biuret group containing isocyanates based on hexamethylene or isophorone diisocyanates. If polyisocyanates or mixtures of di- and polyisocyanates are used, it has proven to be advantageous that they have a functionality of 2 to 3, preferably 2 to 2.5.

Usually preferred as polyols (b) for the preparation of the lightfast polyurethane skin are di- to hexafunctional, preferably di- to tetrafunctional polyester polyols and particularly polyether polyols having molecular weights of 1000 to 8000, preferably 2000 to 7000. However, other hydroxyl group containing polymers with the above-referenced molecular weights may also be used, for example, polyester amides, polyacetals such as polyoxymethylenes, and butanediol-formals, polybutadienes, and polycarbonates, particularly those produced by the transesterification of diphenylcarbonate and 1,6-hexanediol.

Suitable polyester polyols may be produced, for instance, from dicarboxylic acids, preferably aliphatic dicarboxylic acids having 2 to 12, preferably 4 to 8 carbon atoms in the alkylene radical and multifunctional alcohols, preferably diols. Examples of dicarboxylic acids which can be used to prepare the polyester polyols include aliphatic dicarboxylic acids such as succinic acid, glutaric acid, pimelic acid, undecanedioic acid, dodecanedioic acid and preferably adipic acid and aromatic dicarboxylic acids such as phthalic acid and terephthalic acid. Examples of multifunctional alcohols which can be used to prepare the polyester polyols include bifunctional alcohols such as propylene glycol, trimethylene glycol, dipropylene glycol, 1,5-pentamethylene glycol, 1,6-hexamethylene glycol, 1,10-decamethylene glycol, glycerine, trimethylolpropane, and preferably ethylene glycol, diethylene glycol, and 1,4-butylene glycol; and multifunctional alcohols such as alkanolamines, for instance triethanolamine and triisopropanolamine. If polyfunctional, particularly trifunctional compounds are used for the manufacture of the polyester polyols, their content must be selected in such a manner that the functionality of the resultant polyester polyols is a maximum of 6, preferably 2 to 4.

The polyester polyols which may be used individually or in form of mixtures preferably have molecular weights of 1000 to 3000 and preferably 1800 to 2500.

However, preferably used as polyols are polyether polyols which are produced by familiar processes from one or more cyclic ethers and an initiator molecule which contains 2 to 8, preferably 2 to 4 active hydrogen atoms, or by polymerization of tetrahydrofuran.

Suitable cyclic ethers for the preparation of the polyether polyols include, for instance, tetrahydrofuran, 1,3-propane oxide, 1,2- or 2,3-butylene oxide, styrene oxide, epichlorohydrin and preferably alkylene oxides such as ethylene oxide and propylene oxide. The cyclic ethers may be used individually, alternatingly, in sequence, or as mixtures. Representative initiator molecules include water; organic dicarboxylic acids such as succinic acid, adipic acid, phthalic acid and terephthalic acid; aliphatic and aromatic, unsubstituted and N-mono, N,N- and N,N'-dialkyl-substituted, diamines having 1 to 4 carbon atoms in the alkyl radical as well as unsubstituted and mono- and dialkyl-substituted ethylene diamine, diethylene triamine, triethylene tetramine, 1,3-propane diamine, 1,3- or 1,4-butane diamine, 1,2-, 1,3-, 1,4-, 1,5- and 1,6-hexamethylene diamine, phenylene diamines, 2,4- and 2,6-toluene diamine, and 4,4'-, 2,4'- and 2,2'-diaminodiphenylmethane. Among the compounds of the referenced group, the following are of particular interest: hydroxyl group containing polytetrahydrofuran, N,N,N',N'-tetrakis(2-hydroxyethyl)ethylenediamine, N,N,N',N'-tetrakis(2-hydroxypropyl)ethylenediamine, N,N,N',N'',N'''-pentakis(2-hydroxypropyl)ethylenetriamine, phenyldiisopropanolamine and higher alkylene oxide adducts of aniline.

Other suitable initator molecules include alkanolamines such as ethanolamine, diethanolamine, N-methyl- and N-ethyl-ethanolamine, N-methyl- and N-ethyl-diethanolamine and triethanolamine, ammonium, hydrazine and hydrazides. Preferably used are multifunctional, particularly bi- and/or trifunctional alcohols such as ethylene glycol, propylene glycol, trimethylene glycol, diethylene glycol, dipropylene glycol, 1,4-butane glycol, 1,6-hexamethylene glycol, glycerine, trimethylolpropane and pentaerythritol.

The polyether polyols have molecular weights from 1000 to 8000, preferably 2000 to 4000 and may be used individually or as mixtures.

Instead of the polyester polyols or polyether polyols, mixtures of polyester and polyether polyols may also be used. In this case, the ratio of the components can be varied within wide limits, for instance, in a weight ratio of 20:80 to 80:20 depending upon the mechanical properties required for the skin and the intended application of the molded part.

In addition to polyols, chain extenders (d) in quantities of 1 mole to 50 moles, preferably 5 moles to 30 moles per mole of polyol are used for the preparation of the lightfast polyurethane skin. Suitable chain extenders include polyfunctional, preferably di- and trifunctional compounds having molecular weights of 60 to 600, preferably of 60 to 300. Examples include di- and trialkanolamines such as di- and triethanolamine and preferably aliphatic diols and triols having 2 to 6 carbon atoms such as ethylene glycol, propylene glycol, trimethylene glycol, 1,4-butane glycol, 1,6-hexamethylene glycol, glycerine and trimethylolpropane as well as low molecular hydroxyl group containing polyalkylene oxides based on ethylene oxide and/or propylene oxide and the previously mentioned initiator molecules such as di-, tri- and tetraethylene glycols and di-, tri- and tetrapropylene glycols.

In order to obtain highly reactive polyurethane systems, unsubstituted and alkyl-substituted aliphatic primary and secondary diamines (c) having 2 to 35, preferably 2 to 15 carbon atoms are used in the preparation of lightfast polyurethane skins. As used herein, aliphatic is intended to include cycloaliphatic primary and secondary amines. Examples of primary and secondary aliphatic diamines include unsubstituted and N,N'-dialkyl-substituted diamines having 1 to 10, preferably 1 to 4 carbon atoms in the alkyl radical and 2 to 12, preferably 2 to 6 carbon atoms in the alkylene radical such as ethylene diamine, N,N'-dimethyl-, N,N'-diethyl-, N,N'-dipropyl- and N,N'-dibutylethylene diamine, propylenediamine, and 1,3-propane diamine, 1,4-butane diamine, N,N'-dimethyl-, N,N'-diethylbutanediamine-1,4, 1,6-hexamethylene diamine, N,N'-dimethyl-, N,N'-diethyl- and N,N'-dibutyl-hexamethylene diamine-1,6, octamethylene diamine-1,8, decamethylene-diamine, N,N'-dimethyl-, N,N-diethyl-, N,N'-dipropyl- and N,N'-dibutyldecamethylene diamine-1,10. Cycloaliphatic primary and secondary diamines which may be used include unsubstituted and N,N'-dialkyl-substituted diamines having 1 to 10, preferably 1 to 4 carbon atoms in the alkyl radical and 6 to 15, preferably 6 to 13 carbon atoms in the cycloalkyl radical. Examples include 1,3- and 1,4-diaminocyclohexane, N,N'-dimethyl-, N,N'-diethyl-, N,N'-dipropyl- and N,N'-dibutyl-1,3- or -1,4-diaminocyclohexane, 1-methyl-2,4- and -2,6-diaminocyclohexane, 1-methyl-N,N'-diethyl-2,4- and -2,6-diaminocyclohexane, isophorone diamine, 2,2'-, 2,4'- and 4,4'-diaminodicyclohexylmethane, N,N'-dimethyl-, N,N'-diethyl- and N,N'-di-N-butyl-4,4'-diamino-dicyclohexylmethane, 3,3'-dimethyl-4,4'-diamino-dicyclohexylmethane, and 4,4'-diamino-dicyclohexyl-(2,2)-propane. The primary and secondary aliphatic and cycloaliphatic diamines may be used individually or in the form of mixtures. Proven to work particularly well and therefore preferably used are tetramethylene diamine, hexamethylene diamine, isophorone diamine, 4,4'-diamino-dicyclohexylmethane, 3,3'-dimethyl-4,4'-diamino-dicyclohexylmethane, and piperazine.

Under certain circumstances, it may be advantageous to use the corresponding aldimines and/or ketimines instead of the primary aliphatic diamines. Suitable aldimines and/or ketimines are obtained, for instance, by reacting the above-referenced primary diamines with aldehydes such as acetaldehyde or butyraldehyde or ketones such as acetone, methylethylketone or cyclohexanone.

The aliphatic primary or secondary diamines (c) are used in quantities of 0.1 to 50 percent by weight, preferably of 2 to 40 percent by weight relative to the weight of the polyols (b) and chain extenders (d).

Compounds which greatly accelerate the reaction of the polyols and the hydroxyl group containing chain extenders with the polyisocyanates are used as catalysts (e). Examples include organic metal compounds preferably organic tin compounds such as tin-(II)-salts of organic carboxylic acids, for instance, tin-(II)-acetate, tin-(II)-octoate, tin-(II)-ethylhexoate and tin-(II)-laurate and the dialkyltin-(IV)-salts of organic carboxylic acids such as dibutyltin diacetate, dibutyltin dilaurate, dibutyltin maleate, and dioctyltin diacetate, as well as the corresponding compounds of zinc, iron(II), cobalt(II), lead(II), copper(II) and mercury(II), such as zinc- and lead octoate, cobalt naphthenate, iron acetylacetonate and mercury acetate. The organic metal compounds are used alone or preferably in combination with strongly basic amines. Examples include amidines such as 2,3-dimethyl-3,4,5,6-tetrahydropyrimidine, tertiary amines such as triethylamine, tributylamine, dimethylbenzylamine, N-methyl-, N-ethyl-, N-cyclohexylmropholine, N,N,N',N'-tetramethylethylenediamine, N,N,N',N'-tetramethyl-butanediamine, pentamethyl-diethylenetriamine, tetramethyl-diaminoethylether, bis(dimethylaminopropyl)urea, dimethylpiperazine, 1,2-dimethylimidazole, 1-azo-bicyclo-(3,3,0)-octane and preferably 1,4-diaza-bicyclo-(2,2,2)-octane and alkanol compounds such as triethanolamine, triisopropanolamine, N-methyl- and N-ethyl-diethanolamine and dimethylethanolamine.

Other suitable catalysts include tris-(dialkylaminoalkyl)-s-hexahydrotriazine, particularly tris-(N,N-dimethylaminopropyl)-s-hexahydrotriazine, tetraalkylammonium hydroxides such as tetramethylammonium hydroxide, alkali hydroxides such as sodium hydroxide and alkali alcoholates such as sodium methylate, potassium isopropylate, and alkali salts of long chained fatty acids having 10 to 20 carbon atoms and which may have OH groups positioned in side chains.

Other examples for catalysts having proven to work well are catalyst combinations with synergistic effects which consist of (a) at least one compound of the group of the alkali hydroxides, -alcoholates, -phenolates, alkali salts of weak acids and/or hexahydrotriazine derivates, and (b) at least one compound of the group of the organo tin, zinc and/or iron(II) compounds.

The catalysts or catalyst combinations are normally used in quantities of 0.001 to 5 percent by weight, preferably of 0.05 to 3 percent by weight based on the weight of the polyol. /

The polyurethane systems forming the skin may also include auxiliaries and additives as they are normally incorporated for the manufacture of polyurethane plastics. Examples include blowing agents, driers, surface-active materials, flame retardants, pore regulators, antioxidants, hydrolysis protection agents, dyes, ultraviolet stabilizers, pigments, fillers, fluxing agents and other additives.

Molded parts having a lightfast dense skin are preferably produced according to the process of this invention. However, it is also possible to produce porous or microporous skins. In order to produce a porous skin, one or more blowing agents which are chemically inert and boil at temperatures below 100° C. are incorporated in the polyurethane system. Examples include hydrocarbons which may be halogenated, with boiling points of preferably −50° to +50° C. at atmospheric pressure. Representative examples include halogenated hydrocarbons such as monochlorodifluoromethane, dichloromonofluoromethane, dichlorodifluoromethane and trichlorofluoromethane and their mixtures, and hydrocarbons such as propane, isobutane, pentane and hexane as well as dimethylether.

The blowing agents, if they are used, are used in quantities of 0.5 to 15 percent by weight, preferably of 5 to 10 percent by weight, relative to 100 parts of polyol. For the preparation of the preferably dense skins, the starting materials, particularly the polyols and chain extenders, must be dry. Suitable drying agents include particularly zeolites, molecular screens, and soluble drying agents such as ortho-carboxylate, acetals, ketals and ketimines.

Surface-active substances include compounds which serve to support the homogenization of the starting materials and which may also be suited for regulating the cell structure of a possibly porous polyurethane skin. Examples include siloxane-oxyalkylene mixed polymerizates and other organopolysiloxanes, oxyethylated alkylphenols, oxyethylated fatty alcohols, paraffin oils, castor oil, resinoleic acid ester, and turkish red oil, which are used in quantities of 0.2 to 6 parts by weight per 100 parts by weight of polyol.

Suitable flame retardants include compounds containing phosphorus and/or halogen atoms which may furthermore reduce the tendency toward brittleness of the polyurethane skin and which function as plasticizers such as tricresol phosphate, tris-2-chloroethylphosphate, trischlorpropylphosphate and tris-2,3-dibromopropylphosphate and inorganic flame retardants such as antimony trioxide, arsenic oxide, ammonium phosphate and others. It has generally proven to be advantageous to use 1 part to 10 parts by weight of the referenced flame retardants per 100 parts by weight of polyol.

More details concerning other commonly used auxiliaries and additives are contained in the appropriate literature, for instance, in the monogram by J. H. Saunders and K. C. Frisch "High Polymers", Vol. XVI, Polyurethanes, Parts 1 and 2 (Interscience Publishers, 1962 and 1964).

The polyurethane foam cores for the molded parts are obtained from the familiar starting components for the preparation of flexible, semi-rigid, and rigid polyurethane foams. Formulations for the corresponding polyurethane materials are described, for instance, by R. Vieweg and A. Hoechtlen, The Plastics Handbook, Vol. VII, "Polyurethanes" (Carl Hanser Publishers, Munich, 1966).

Now that the ingredients used for preparing the polyurethane skin and the polyurethane core have been described, the details relative to the process for preparing molded polyurethane parts having a lightfast surface skin will be described.

It should be noted first that for the preparation of the polyurethane skin, the molecular weight and the functionality of the polyols are selected in such a manner that rigid skins are formed for covering rigid foam cores and that flexible skins are formed for covering flexible foam cores with infinite transitions being possible between the individual foam types.

The polyurethane skin is most advantageously produced by using a two-component system. The polyol (b), the chain extender (d), the aliphatic primary or secondary diamines (c), the catalyst as well as possibly auxiliaries and additives (e) are combined to form component A. The organic polyisocyanates (a) are used as component B. Components A and B, which are metered via piston pumps in such a manner that the ratio of the isocyanate groups to the Zerewitinoff active hydrogen atoms of components (b) to (d) is 0.9 to 1.2:1, preferably 1 to 1.1:1, are sprayed to the inside walls (which may be coated with a release agent) of an open molding tool using a two-component spray injection machine having a spray gun with a built in static mixture. Prior to mixing, components A and B have temperatures of approximately 10° C. to 60° C., preferably 10° C. to 40° C., whereas the molding tool which may consist of metal or plastic, is maintained at temperatures from 20° C. to 70° C., preferably 40° C. to 50° C. Because solvents are not used and highly reactive primary or secondary aliphatic diamines are used for the manufacture of polyurethane skin, the polyurethane system does not run off the coated vertical walls and does not form bubbles even with greater layer thicknesses. After the formation of the skin, which may consist of one or more layers which may be dyed with different colors, the molding tool is filled with conventional polyurethane systems which are foamed in the familiar manner to form the polyurethane core.

In accordance with this invention, the molded parts are produced in open molding tools. This means that the molded parts do not have a lightfast skin on at least one side of the surface. Particularly advantageous results are achieved, for instance, in the case of molded parts having a square appearance where the surface on two to five sides (for instance the base surface and a side surface or the four side surfaces) consist of a lightfast skin.

The examples which follow will specifically demonstrate how to practice this invention, but are not in any way intended to limit its scope of application. The parts referred to in the examples are parts by weight and the temperatures are in degrees Centigrade unless otherwise specified.

EXAMPLE 1

Component A is prepared by mixing the following ingredients:
67 parts of a polyether polyol based on trimethylolpropane, propylene oxide and ethylene oxide having a hydroxyl number of 45,
24 parts of ethylene glycol,
10 parts of 3,3'-dimethyl-4,4'-diaminodicyclohexylmethane,
3 parts of dibutyltin dilaurate, and
5 parts of Zeolith T (manufactured by Bayer AG, Leverkusen).

Component B is prepared by mixing the following ingredients:
50 parts of a urethane group containing diisocyanate based on hexamethylenediisocyanate having an NCO content of 17 percent by weight, and
50 parts of a biuret group containing polyisocyante based on hexamethylene diisocyanate having an NCO content of 23 percent by weight.

Using a two-component spray gun with static mixture, 100 parts of component A at a temperature of 25° C. and 184 parts of component B at a temperature of 25° C. are mixed intensively and are sprayed to the inside walls of an aluminum molding tool having dimensions of 20×20×1 centimeter in such a quantity that the layer thickness will amount to 0.5 millimeter. The mold is open at the top and has a temperature of 40° C. The tack-free time (t) is 25 seconds.

The molding tool, the inside of which has been coated in this manner, is subsequently filled with 240 grams of a foamable mixture consisting of the following:
96.8 parts of a polyether polyol having a hydroxyl number of 25 and a molecular weight of 6500,
1.6 parts of glycerine, and
1.6 parts of water as the A-component; and
50 parts of crude MDI as the B-component.

The molding tool is closed and the mixture is allowed to foam. The result is a molded part, the skin of which has the mechanical values compiled in Table 2.

EXAMPLES 2-11 AND COMPARISON EXAMPLE A

Example 1 is duplicated but the starting components summarized in Table 1 for the manufacture of the polyurethane skin are used. The amounts used are also those put forth in Table 1.

The mechanical properties of the polyurethane skin are found in Table 2.

The names of the components in Table 1 were abbreviated as follows:
Polyol 1: trifunctional polyether polyol of propylene oxide and ethylene oxide having a hydroxyl number of 45.
Polyol 2: difunctional polyether polyol based on propylene oxide/ethylene oxide having a hydroxyl number of 28.
Polyol 3: linear polyester polyol having a hydroxyl number of 56.
EG: ethylene glycol

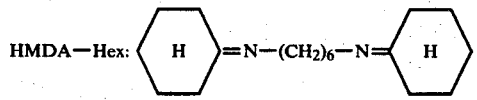

HMDA: Hexamethylenediamine
La C 260: 3,3'-dimethyl-4,4'-diaminodicyclohexylmethane
Dicycan: 4,4'-diamino-dicyclohexylmethane
D 22: Dibutyltin dilaurate
Zeolith T: Drying agent produced by Bayer AG, Leverkusen
HMDI-Urethane: urethane group containing hexamethylene diisocyanate having an isocyanate content of 17 percent by weight.
HMDI-Biuret: biuret group containing hexamethylene diisocyanate having an isocyanate content of 23 percent by weight.
B/100A: mixing ratio: parts of component B per 100 parts of component A.

TABLE 1

| Example Comparison Example | 2 | 3 | 4 | 5 | 6 | 7 | 8 | 9 | 10 | 11 | A |
|---|---|---|---|---|---|---|---|---|---|---|---|
| Component A: | | | | | | | | | | | |
| Polyol 1 [parts] | 67 | 67 | 67 | 49 | 67 | — | 38.4 | — | 50 | 50 | 50 |
| Polyol 2 [parts] | — | — | — | — | — | — | 38.4 | — | — | — | — |
| Polyol 3 [parts] | — | — | — | — | — | 85 | — | 85 | — | — | — |
| EG [Parts] | 24 | 24 | 24 | 26 | 24 | 28.3 | 18 | 28.3 | 17.3 | 25 | 20 |
| LaC [parts] | — | — | — | — | — | — | — | — | — | 40 | — |
| HMDA—Hex [parts] | 12 | — | — | — | 12 | 12 | — | 12 | 12 | — | — |
| HMDA [parts] | — | — | — | 21 | — | — | — | — | — | — | — |
| Piperazine [parts] | — | 3.8 | — | — | — | — | 3.8 | — | — | — | — |
| Dicyan [parts] | — | — | 3.8 | — | — | — | — | — | — | — | — |
| D 22 [parts] | 3 | 3 | 3 | 1 | 3 | 3 | 2.5 | 3 | 2.4 | 1.5 | 2.4 |
| Zeolith T [parts] | — | 5 | 5 | 3.5 | — | — | 5 | — | — | 5 | — |
| Component B: | | | | | | | | | | | |
| HMDI—Urethane [parts] | 50 | 50 | 50 | 50 | 100 | 50 | 50 | 100 | 50 | 100 | 50 |
| HMDI—Biuret [parts] | 50 | 50 | 50 | 50 | — | 50 | 50 | — | 50 | — | 50 |
| B/100 A | 175 | 184 | 184 | 268 | 227 | 168 | 137 | 168 | 200 | 236 | 200 |
| t tack-free [sec] | 22 | 30 | 20 | 20 | 15 | 30 | 35 | 25 | 25 | 30 | 45 |

TABLE 1-continued

| Example Comparison Example | 2 | 3 | 4 | 5 | 6 | 7 | 8 | 9 | 10 | 11 | A |
|---|---|---|---|---|---|---|---|---|---|---|---|
| Comments: | ← | ← | ← | ← | does no drip | → | → | → | → | → | drips |

TABLE 2

| | Mechanical Values of the Polyurethane Skin at Room Temperature (23° C.) | | | | | | |
|---|---|---|---|---|---|---|---|
| Example Comparison Example | Xenon test ASTM D 1925-67 D YI 500 hrs. | Hardness Shore D DIN 53505 | Elasticity Modulus DIN 53457 N/mm | Graves Tear Strength DIN 53457 N/mm | Tear Strength DIN 53504 N/mm | Elongation DIN 53504 % | Abrasion DIN 53516 grams |
| 1 | 2 | 50 | 350 | 60 | 25 | 200 | 0.300 |
| 2 | 3 | 55 | 450 | 50 | 15 | 140 | 0.300 |
| 3 | 8 | 50 | 400 | 55 | 15 | 180 | 0.250 |
| 4 | 5 | 22 | 5 | 10 | 5 | 200 | 0.250 |
| 5 | 3 | 54 | 365 | 50 | 10 | 100 | 0.250 |
| 6 | 2 | 40 | 11 | 40 | 20 | 500 | 0.200 |
| 7 | 4 | 36 | 8 | 40 | 6 | 230 | 0.200 |
| 8 | 5 | 30 | 8 | 11 | 3 | 170 | 0.200 |
| 9 | 6 | 30 | 10 | 30 | 6 | 250 | 0.200 |
| 10 | 8 | 50 | 300 | 70 | 25 | 200 | 0.300 |
| 11 | 6 | 63 | 540 | 45 | 24 | 60 | 0.300 |
| A | 3 | 50 | 300 | 75 | 20 | 200 | 0.300 |

The embodiments of the invention in which an exclusive privilege or property is claimed are defined as follows:

1. A process for the preparation of molded parts having a lightfast polyurethane skin and a polyurethane foam core comprising
   A. applying a mixture of the following ingredients, which are reacted in one stage, to the inside wall of an open mold in an amount sufficient to form a skin for the molded part:
      (1) an organic polyisocyanate, selected from the group consisting of an aliphatic, cycloaliphatic, and a urethane, biuret, or isocyanurate group containing aliphatic or cycloaliphatic polyisocyanate
      (2) a polyol having a molecular weight of 1000 to 8000,
      (3) an aliphatic primary or secondary diamine,
      (4) chain extender, other than c, having a molecular weight of 60 to 600, selected from the group consisting of dialkanolamines, trialkanolamines, aliphatic diols and triols having 2 to 6 carbon atoms, and hydroxyl group-containing polyalkylene oxides based on ethylene oxide and/or propylene oxide and an initiator, and
      (5) a catalyst; and
   B. filling the mold with a formable polyurethane reaction mixture;
   C. foaming and curing the foamed composite resin product and subsequently removing it from the mold.

2. The process of claim 1 wherein ingredients (b) to (e) are combined as component A and the organic polyisocyanate (a) is used as component B and wherein components A and B are mixed in a static mixer.

3. The process of claims 1 or 2 wherein the mixture for forming the lightfast polyurethane skin is applied on the inside wall of the molding tool by spraying.

4. The process of claim 1 wherein the amount of mixture used for forming the polyurethane skin of the molded part is sufficient to form a skin of 0.5 millimeter to 5 millimeters.

5. The process of claim 1 wherein urethane, biuret, or isocyanurate group containing aliphatic or cycloaliphatic polyisocyanates are used as the organic polyisocyanate.

6. The process of claim 1 wherein ethylene glycol is used a the chain extender.

7. The process of claim 1 wherein the aliphatic primary or secondary diamines are used in quantities of 0.1 to 50 percent by weight relative to the total weight of components (b) and (d).

8. The process of claim 1 wherein the polyol is a polyether polyol having a molecular weight of 1800 to 2500.

9. The process of claim 1 wherein the aliphatic diamine is selected from the group consisting of tetramethylenediamine, hexamethylenediamine, 3,3'-dimethyl-4,4'-diaminodicyclohexylmethane, 4,4'-diaminodicyclohexylmethane, piperazine, and N,N'-dicyclohexamethylenediamine.

10. The process of claim 1 wherein (c) is an aldimine or ketimine obtained by the reaction of an aliphatic primary or secondary diamine with an aldehyde or ketone.

11. The process of claim 10 wherein the ketimine is N,N'-dicyclohexyl-hexane-diimine.

12. A molded polyurethane part prepared in accordance with claim 1.

* * * * *